United States Patent
Hanley et al.

(10) Patent No.: US 8,365,541 B2
(45) Date of Patent: Feb. 5, 2013

(54) METHOD AND APPARATUS USING EVAPORATOR FAN POWER REQUIREMENTS TO DETERMINE DEFROST CYCLE FOR A REFRIGERATOR APPLIANCE

(75) Inventors: Kenneth Joseph Hanley, Louisville, KY (US); Jeffrey Martin Wood, Louisville, KY (US); Martin Christopher Severance, Louisville, KY (US); Jason Andrew May, Prospect, KY (US)

(73) Assignee: General Electric Company, Schenectady, NY (US)

( * ) Notice: Subject to any disclaimer, the term of this patent is extended or adjusted under 35 U.S.C. 154(b) by 246 days.

(21) Appl. No.: 12/939,219

(22) Filed: Nov. 4, 2010

(65) Prior Publication Data

US 2012/0047920 A1    Mar. 1, 2012

(51) Int. Cl.
*F25D 21/00* (2006.01)
(52) U.S. Cl. ............................................. 62/80; 62/234
(58) Field of Classification Search .............. 62/80, 151, 62/155, 234, 230, 231
See application file for complete search history.

(56) References Cited

U.S. PATENT DOCUMENTS

| 4,724,678 | A  | * | 2/1988 | Pohl .................................. 62/80 |
| 5,201,888 | A  |   | 4/1993 | Beach, Jr. et al. |
| 5,761,908 | A  | * | 6/1998 | Oas et al. ......................... 62/3.2 |
| 5,816,455 | A  | * | 10/1998 | Alpers et al. ................... 222/388 |
| 6,014,325 | A  | * | 1/2000 | Pecore .......................... 363/126 |
| 6,622,503 | B1 | * | 9/2003 | Bennett et al. .................. 62/186 |
| 7,665,317 | B2 |   | 2/2010 | Boer et al. |
| 7,900,465 | B2 | * | 3/2011 | Wetekamp et al. ............. 62/187 |
| 8,141,375 | B2 | * | 3/2012 | Malpetti ......................... 62/187 |
| 2005/0165527 | A1 | * | 7/2005 | Gorman et al. ................. 701/36 |
| 2006/0021365 | A1 | * | 2/2006 | Cushman et al. ............... 62/187 |
| 2006/0218946 | A1 | * | 10/2006 | Davern et al. .................. 62/155 |
| 2007/0012054 | A1 | * | 1/2007 | Schenk et al. .................. 62/208 |

\* cited by examiner

*Primary Examiner* — Mohammad Ali
(74) *Attorney, Agent, or Firm* — Dority & Manning, P.A.

(57) ABSTRACT

A refrigerator and a method of operating a refrigerator to determine the time at which to initiate a defrost cycle is provided. Changes in the voltage provided to an evaporator fan are used to determine and/or predict when to initiate a defrost cycle. Adjustments to the timing of the defrost cycle can be made based on known periods of peak energy demand and/or the increased costs associated with operating the defrost cycle during such peak energy demand periods.

19 Claims, 3 Drawing Sheets

METHOD AND APPARATUS USING EVAPORATOR FAN POWER REQUIREMENTS TO DETERMINE DEFROST CYCLE FOR A REFRIGERATOR APPLIANCE

FIELD OF THE INVENTION

The present invention relates to refrigerator appliances and, more particularly to a refrigerator and a method of operating a refrigerator for determining a time at which to initiate a defrost cycle.

BACKGROUND OF THE INVENTION

Modern refrigerator appliances use a gas-based refrigerant to provide cooling for the fresh food and/or freezer compartment of the refrigerator. The refrigerant is circulated within a loop that includes passage through the inside compartment(s) of the refrigerator. Heat is withdrawn from inside the refrigerator by blowing air across an evaporator in which the refrigerant changes state from a liquid to a gas by absorbing heat energy from the air. The chilled air is circulated throughout the inside of the refrigerator to lower the temperature, including food items, in the internal compartments. Thereafter, the refrigerant is compressed and subsequently cooled by passage through a heat exchanger—more commonly referred to as a condenser. The condenser is typically exposed to ambient air for heat exchange therewith.

Due to the repeated passage of air over the evaporator, moisture in the air will eventually condense and become frost on the coils of the evaporator. As a fan blows more air across these coils, if left unchecked, a frost load will continue to build-up on the evaporator. This build-up is undesirable because e.g., it decreases the cooling efficiency of the evaporator and therefore increases the energy usage of the refrigerator. In addition, in order to maintain a constant flow of air through the internal compartments despite the resistance caused by the ice build up, increased power is required to maintain the fan at a constant target speed.

Accordingly, most refrigerator appliances make use of a defrost cycle in order to remove and reduce the build-up of ice on the evaporator. Several techniques can be used to effect the defrost cycle. For example, some refrigerators use a heater to melt the ice away from the evaporator. The defrost cycle may be triggered by temperature sensors located near the evaporator or otherwise in the freezer compartment. Some refrigerators may use timers that automatically defrost after some predetermined period of time. Still others may use complex algorithms that determine a defrost cycle based on variables such as e.g., how many times the refrigerator doors have been opened allowing moisture-laden air into the internal compartments.

Executing a defrost cycle causes the refrigerator to consume more energy. For example, the heaters for melting the ice require energy to operate. Depending upon the length of the defrost cycle, the refrigerator will consume additional energy cooling the internal compartments of the refrigerator back to the desired temperatures upon completion of the defrost cycle. Thus, unnecessary operation of the defrost cycle is undesirable.

Additionally, there may be times during which operation of the defrost cycle is more cost effective than at other times. Electric utilities are typically required to provide generation equipment capable of handling peak energy demand periods caused by similar use patterns among customers such as e.g., early morning usage as multiple customers awake and begin to consume electricity in starting and preparing for the day. This additional equipment comes at additional capital and operating expense, which must ultimately be borne by the consumer. Some utilities may even increase their charges per energy unit for usage during these periods of peak energy demand versus usage at non-peak times.

Accordingly, a refrigerator that can more accurately determine when to initiate a defrost cycle would be useful. A refrigerator that can also predict when a defrost cycle will be necessary and determine whether such defrost cycle should be delayed or accelerated based on peak electricity demand periods and/or periods of increased electricity cost would also be particularly beneficial.

BRIEF DESCRIPTION OF THE INVENTION

Aspects and advantages of the invention will be set forth in part in the following description, or may be obvious from the description, or may be learned through practice of the invention.

In one exemplary aspect, the present invention provides a method for determining a defrost cycle for a refrigerator. The refrigerator includes a refrigeration cycle having at least one evaporator and evaporator fan. The method includes the steps of monitoring the power required to operate the evaporator fan; determining whether the power required to operate the evaporator fan has reached a predetermined value and, if so, initiating a defrost cycle for the refrigerator.

In another exemplary embodiment, the present invention provides a refrigerator appliance. The refrigerator appliance includes an evaporator for providing chilled air. A fan is included for moving air over the evaporator for circulation within the refrigerator. The refrigerator includes at least one processing device that is configured to receive measurements of the power required to operate the evaporator fan, determine whether the power required to operate the evaporator fan has reached a predetermined threshold and, if so, initiate a defrost cycle for the refrigerator.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
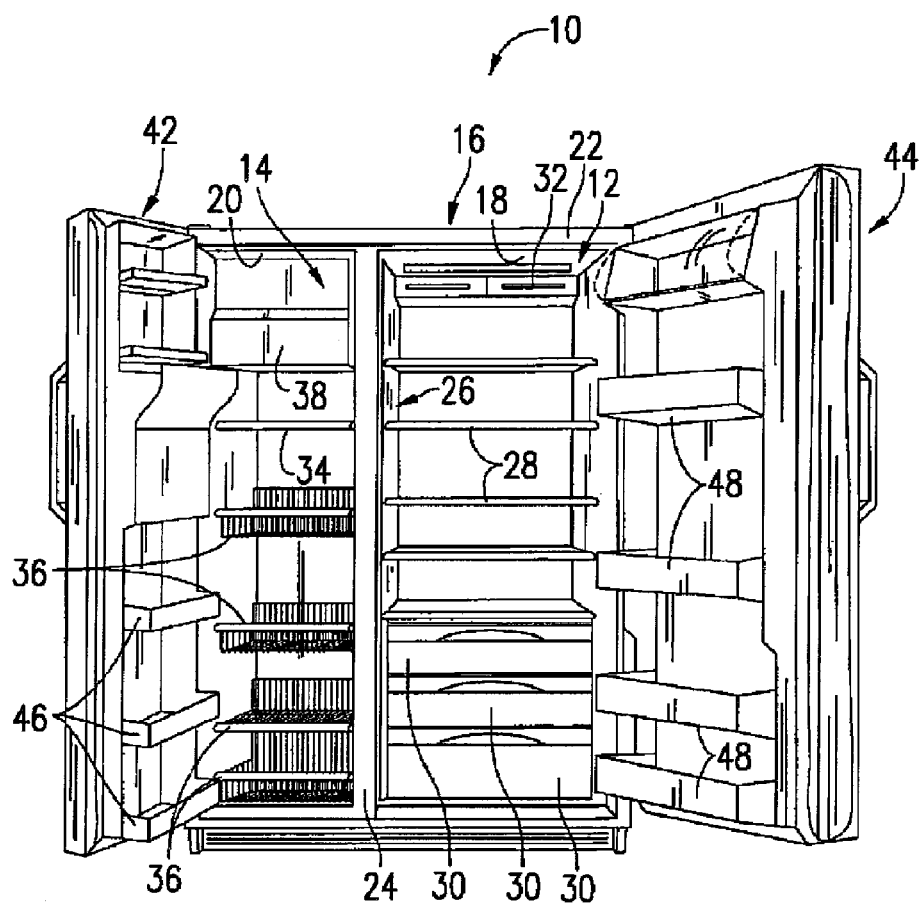
FIG. 1 provides an illustration of an exemplary embodiment of a refrigerator (shown with doors open) as may be used with the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front view of a representative refrigerator 10 incorporating an exemplary embodiment of the present invention. For illustrative purposes, the present invention is described with a refrigerator 10 having a construction as shown and described further below. As used herein, a refrigerator includes appliances such as a freezer, refrigerator/freezer combination, compact, and any other style or model of a refrigerator. Accordingly, other configurations including multiple and different styled compartments could be used with refrigerator 10, it being understood that the configuration shown in FIG. 1 is by way of example only.

Refrigerator 10 includes a fresh food storage compartment 12 and a freezer storage compartment 14. Freezer compartment 14 and fresh food compartment 12 are arranged side-by-side within an outer case 16 and defined by inner liners 18 and 20 therein. A space between case 16 and liners 18 and 20, and between liners 18 and 20, is filled with foamed-in-place insulation. Outer case 16 normally is formed by folding a sheet of a suitable material, such as pre-painted steel, into an inverted U-shape to form top and side walls of case 16. A bottom wall of case 16 normally is formed separately and attached to the case side walls and to a bottom frame that provides support for refrigerator 10. Inner liners 18 and 20 are molded from a suitable plastic material to form freezer compartment 14 and fresh food compartment 12, respectively. Alternatively, liners 18, 20 may be formed by bending and welding a sheet of a suitable metal, such as steel. The illustrative embodiment includes two separate liners 18, 20 as it is a relatively large capacity unit and separate liners add strength and are easier to maintain within manufacturing tolerances. In smaller refrigerators, a single liner is formed and a mullion spans between opposite sides of the liner to divide it into a freezer compartment and a fresh food compartment.

A breaker strip 22 extends between a case front flange and outer front edges of liners 18, 20. Breaker strip 22 is formed from a suitable resilient material, such as an extruded acrylobutadiene-styrene based material (commonly referred to as ABS). The insulation in the space between liners 18, 20 is covered by another strip of suitable resilient material, which also commonly is referred to as a mullion 24. In one embodiment, mullion 24 is formed of an extruded ABS material. Breaker strip 22 and mullion 24 form a front face, and extend completely around inner peripheral edges of case 16 and vertically between liners 18, 20. Mullion 24, insulation between compartments, and a spaced wall of liners separating compartments, sometimes are collectively referred to herein as a center mullion wall 26. In addition, refrigerator 10 includes shelves 28 and slide-out storage drawers 30, sometimes referred to as storage pans, which normally are provided in fresh food compartment 12 to support items being stored therein.

Refrigerator 10 is controlled by a processing device or other controller, such as a microprocessor (not shown), according to user preference via manipulation of a control interface 32 mounted in an upper region of fresh food storage compartment 12 and coupled to the microprocessor. A shelf 34 and wire baskets 36 are also provided in freezer compartment 14. In addition, an ice maker 38 may be provided in freezer compartment 14. As discussed below, the processing device also has features related to the defrost cycle.

A freezer door 42 and a fresh food door 44 close access openings to fresh food and freezer compartments 12, 14, respectively. Each door 42, 44 is mounted to rotate about its outer vertical edge between an open position, as shown in FIG. 1, and a closed position (not shown) closing the associated storage compartment. Freezer door 42 includes a plurality of storage shelves 46, and fresh food door 44 includes a plurality of storage shelves 48.

Figure 2:
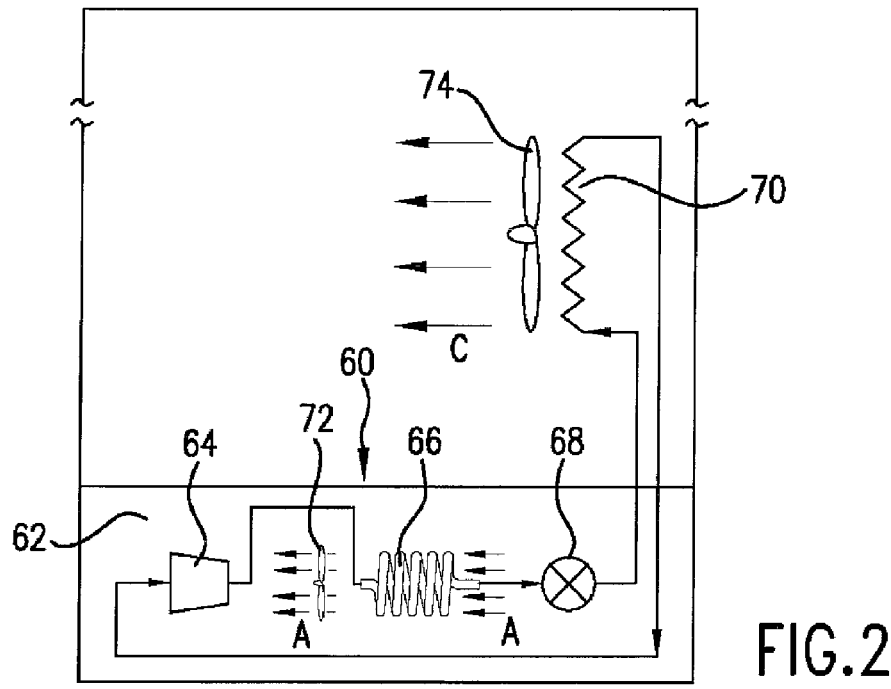
FIG. 2 is a schematic illustration providing an example of a refrigeration cycle as may be used with the present invention.

FIG. 2 is an elevational schematic view of refrigerator 10 (shown in FIG. 1) including an exemplary sealed cooling system 60. In accordance with known refrigerators, refrigerator 10 includes a machinery compartment 62 that at least partially contains components for executing a known vapor compression cycle for cooling air. The components include a compressor 64, a heat exchanger or condenser 66, an expansion device 68, and an evaporator 70 connected in series and charged with a refrigerant. Evaporator 70 is also a type of heat exchanger which transfers heat from air passing over the evaporator to a refrigerant flowing through evaporator 70 thereby causing the refrigerant to vaporize. As such, cooled air is produced and configured to refrigerate compartments 12, 14 of refrigerator 10.

From evaporator 70, vaporized refrigerant flows to compressor 64, which operates to increase the pressure of the refrigerant. This compression of the refrigerant raises its temperature, which is lowered by passing the gaseous refrigerant through condenser 66 where heat exchange with ambient air takes place so as to cool the refrigerant. A fan 72 is used to pull air across condenser 66, as illustrated by arrows A, so as to provide forced convection for a more rapid and efficient heat exchange between the refrigerant and the ambient air.

Expansion device 68 further reduces the pressure of refrigerant leaving condenser 66 before being fed as a liquid to evaporator 70. Collectively, the vapor compression cycle components in a refrigeration circuit, associated fans, and associated compartments are sometimes referred to as a sealed refrigeration system operable to force cold air through refrigeration compartments 12, 14. The refrigeration system depicted in FIG. 2 is provided by way of example only. It is within the scope of the present invention for other configurations of the refrigeration system to be used as well. For example, fan 74 may be repositioned so as to push air across evaporator 70, dual evaporators may be used with one or more fans, and numerous other configurations may be applied as well.

During operation of refrigerator 10, ice or frost will begin to accumulate on evaporator 70. Moisture in the air is replenished by e.g., opening doors 42 and 44, which allows moisture laden air into compartments 12 and 14. The moisture condenses into ice upon contact with evaporator 70. Fan 74 blows air across evaporator 70 so as to circulate cold air within compartments 12 and 14. Typically, a damper (not shown) controls the amount of such air between compartments 12 and 14.

As the ice accumulates, the power required by fan 74 will increase. For example, in order to maintain a proper rpm or speed for fan 74, the voltage, current, or both, that is supplied to fan 74 will also be increased. If the power is not increased, the rpm of the fan will decrease due to loading of the evaporator by frost and/or moisture. Eventually the ice accumulation will reach a level at which a defrost cycle should be initiated for refrigerator 10. By monitoring the power required to operate fan 74 (including e.g., changes in such power requirement) the microprocessor can determine when to initiate the defrost cycle. In addition, in certain aspects of the invention, the microprocessor may be configured to also monitor the rpm of fan 74 to determine when to initiate a defrost cycle.

As will be understood from the application of Ohm's law, there are several methods by which the power required to operate fan 74 (and changes thereto) may be monitored. For example, the microprocessor could monitor measurements of the current supplied to fan 74, the voltage supplied to fan 74, and/or the resistance or load provided by fan 74 during operation. By determining whether any one (or a combination thereof) of the measurements of voltage, current, and/or resistance has reached a predetermined value during operation of fan 74, the microprocessor can determine whether to initiate a defrost cycle.

Figure 3:
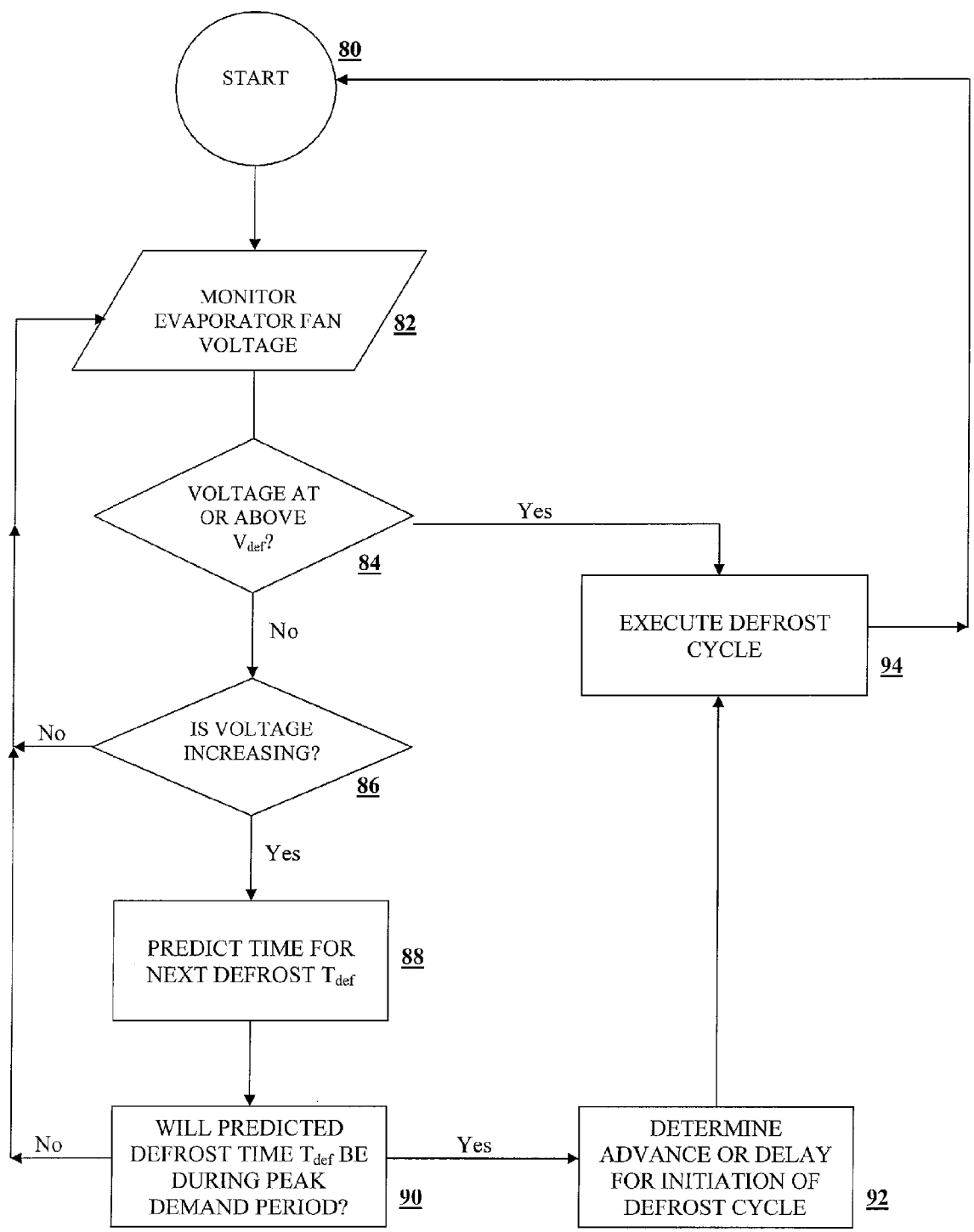
FIG. 3 is a flow chart illustrating exemplary methods of the present invention.

For example, FIG. 3 provides an exemplary flowchart showing steps that use the voltage supplied to fan 74 to determine whether to initiate a defrost cycle. More particularly, as used herein, $V_{def}$ is a predetermined value of fan voltage at which it is desirable that the defrost cycle be initiated. For example, $V_{def}$ may be the maximum desired voltage for operation of fan 74. $V_{def}$ could, for example, be defined experimentally by an appliance designer through measuring the voltage supplied to fan 74 once an unacceptable level of ice accumulation has deposited on evaporator 70.

From start 80, the processing device (such as a controller or microprocessor) in refrigerator 10 monitors the speed of fan 74 and/or the voltage supplied to fan 74 in order to maintain a target fan speed (step 82). At step 84, the microprocessor determines if the fan voltage has reached $V_{def}$. If so, the evaporator 70 must be defrosted so the processing device initiates a defrost cycle as in step 94.

If the voltage supplied to fan 74 has not yet reached $V_{def}$, then the processor device determines whether the fan voltage is increasing as in step 86. If the evaporator fan voltage is not increasing, the processing device continues monitoring the voltage as in step 82 because such condition indicates that no significant accumulation of ice on evaporator 70 is occurring. However, if the voltage supplied to evaporator fan 74 is increasing as indicates a frost or moisture accumulation, then in step 88 the processing device uses the rate of voltage increase to predict the time, $T_{def}$, at which when the fan voltage might reach $V_{def}$, the voltage at which the defrost cycle should be initiated.

Various algorithms may be devised to predict time $T_{def}$. For example, a linear extrapolation based upon the rate of change in the fan voltage between two points in time can be used to predict the time $T_{def}$ at which $V_{def}$ will occur. Alternatively, the processing device can be configured with an algorithm based on experimental data previously developed. Non-linear algorithms may be used as well. Using the teachings disclosed herein, one of ordinary skill in the art will understand that other techniques may be applied as well.

Once the processing device has predicted the time $T_{def}$ when $V_{def}$ will occur, various options can be provided to improve the efficiency and/or operating expense of refrigerator 10. For example, as set forth in step 90, the processing device is equipped with a clock or timer and can determine whether the predicted time $T_{def}$ falls during a period of peak energy demand. If the predicted time $T_{def}$ falls during e.g., morning hours of peak energy demand, then the processing device can advance or delay the time $T_{def}$ at which the defrost cycle will be initiated as set forth in step 92. Accordingly, if the predicted time $T_{def}$ for initiating the defrost cycle falls, for example, around 7 AM, then the processing device might change time $T_{def}$ to an earlier hour such as 3 AM or to a later time in the day. Once a time $T_{def}$ is established, a defrost cycle is initiated as in step 94. After completion of the defrost cycle, the processing device returns to start 80 and begins again to monitor the voltage to evaporator fan 74 as in step 82.

The processing device of refrigerator 10 can also be configured to conduct other evaluations in step 92 as well. For example, based on the current voltage measured for evaporator fan 74 and the rate at which such voltage is increasing, the processing device can be configured to determine whether the time $T_{def}$ for initiating the defrost cycle can be delayed before voltage $V_{def}$ is reached or before the evaporator coil reaches a critical capacity. Using this information, the processing device can determine by what amount the time $T_{def}$ for initiating the defrost can be delayed or whether the defrost cycle must be triggered without delay.

Still other options can be provided for the operation of refrigerator 10 based on monitoring of the voltage for evaporator fan 74. For applications where an energy utility charges higher prices per energy unit for consumption during periods of peak energy demand, the processing device of refrigerator 10 can be provided with information regarding the price differential. For example, an input device can be provided whereby the costs per energy unit or the differential for periods of peak energy demand can be provided to the processing device.

Using this information, as part of step 92, the processing device can calculate the difference in energy cost between initiating the defrost cycle during a period of peak energy demand versus continuing to operate the frosted evaporator (which requires additional energy due to the increase air flow resistance placing a higher demand on evaporator fan 74) until a period of non-peak energy demand. Alternatively, in step 92, the processing device can determine the amount of energy consumption for operating a defrost cycle versus continuing to supply increased voltage to operate evaporator fan 74. With this comparison, the processing device can determine an optimal time $T_{def}$ for initiating a defrost cycle and provide any advance or delay as needed.

Figure 4:
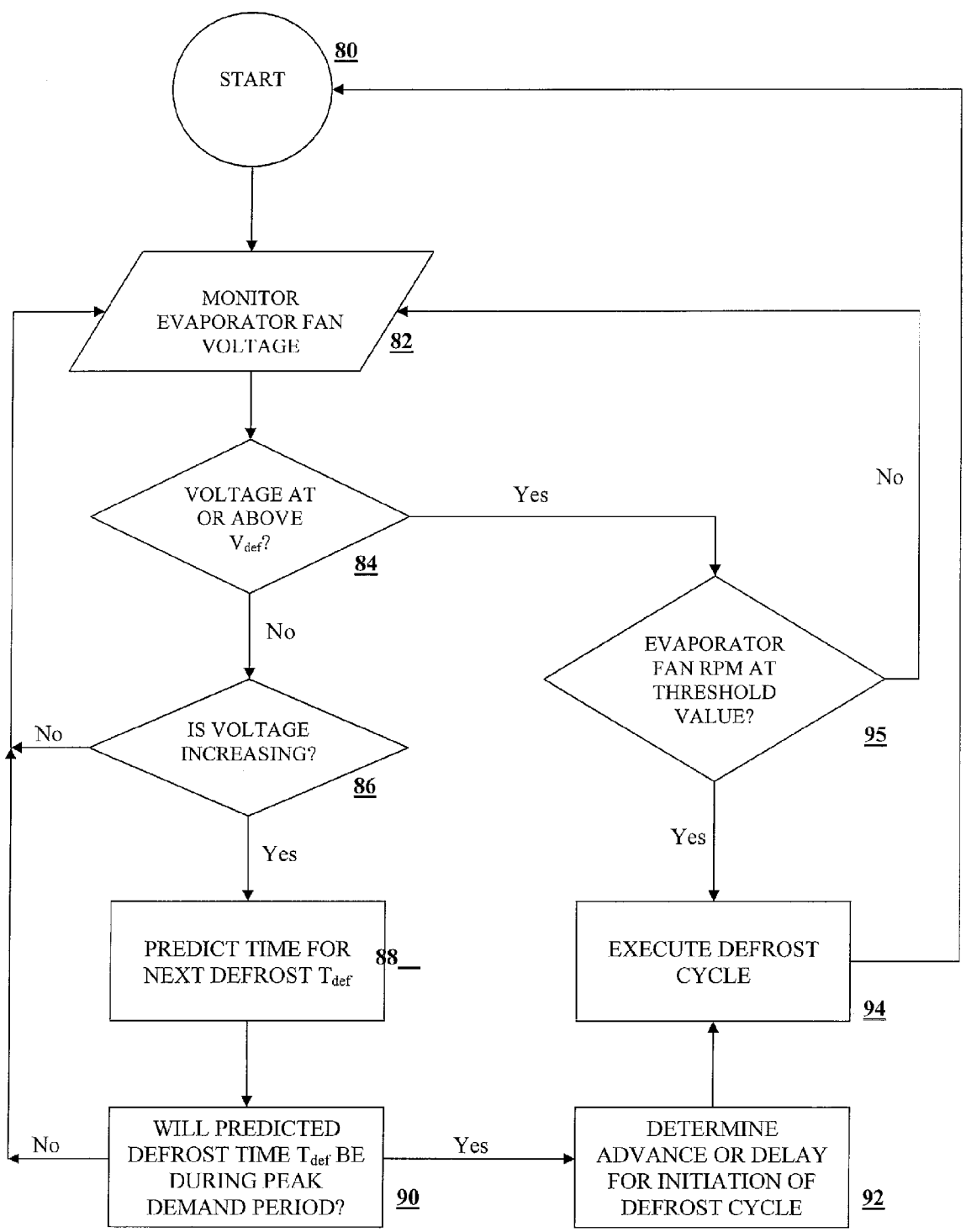
FIG. 4 is a flow chart illustrating exemplary methods of the present invention.

FIG. 4 provides another exemplary method of the present invention similar to FIG. 3 in that the voltage supplied to fan 74 is used as part of determining whether to initiate a defrost cycle. However, the method of FIG. 4 includes an additional step 95 in which the processing device determines whether the speed of evaporator fan 74 has also decreased to a threshold value before initiating a defrost cycle. For example, after determining that $V_{def}$ has been reached, it may be acceptable to allow refrigerator to continue operating because the speed of fan 74 is still sufficient for the required air flow. In step 95, the processing device allows the refrigerator 10 to continue operating with the defrost cycle until the fan speed decreases to a certain threshold value indicating that the accumulation of frost now requires a defrost cycle to be initiated as in step 94.

As will be understood by one of skill in the art using the teachings disclosed herein, similar routines for monitoring the power to evaporator fan 74 by measuring the current or resistance load may also be applied and are within the scope of the present invention. Combinations of measurements of the current, voltage, and/or resistance load (directly or by measurement of fan 74 rpm) may also be applied and are within the scope of the present invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for determining a defrost cycle for a refrigerator, the refrigerator having a refrigeration cycle that includes an evaporator and evaporator fan, the steps comprising:
   monitoring the power required operate the evaporator fan; and
   determining whether the power required to operate the evaporator fan has reached a predetermined threshold and, if so, then
      detecting whether the fan speed has reached a certain minimum value and, if so, then
         initiating a defrost cycle for the refrigerator.

2. The method for determining a defrost cycle for a refrigerator as in claim 1, wherein said steps of monitoring and determining comprise:
   providing measurements of one or more of the i) the fan voltage supplied to the evaporator fan, ii) the current supplied to the evaporator fan, iii) the resistance load, and iv) the inductive load that includes the evaporator fan;
   ascertaining whether one or more of the measurements from said providing step have reached a threshold value and, if so, then
      detecting whether the fan speed has reached a certain minimum value and, if so, then
         initiating a defrost cycle for the refrigerator.

3. The method for determining a defrost cycle for a refrigerator as in claim 1, wherein the defrost cycle is initiated at time $T_{def}$ and the method further comprises the steps of:
   ascertaining whether the power requirement for the evaporator fan is increasing and, if so, then
   predicting the time, $T_{def}$, at which a defrost cycle should be initiated for the refrigerator; and
   adjusting the time, $T_{def}$, at which a defrost cycle should be initiated.

4. The method for determining a defrost cycle for a refrigerator as in claim 3, wherein said adjusting step comprises delaying the time, $T_{def}$, at which a defrost cycle should be initiated.

5. The method for determining a defrost cycle for a refrigerator as in claim 3, wherein said adjusting step comprises advancing the time, $T_{def}$, at which a defrost cycle should be initiated.

6. The method for determining a defrost cycle for a refrigerator as in claim 1, wherein the defrost cycle is initiated at time $T_{def}$ and the method further comprises the steps of:
   ascertaining whether the power requirement for the evaporator fan is increasing and, if so, then
   predicting the time, $T_{def}$, at which a defrost cycle should be initiated for the refrigerator;
   determining whether the time, $T_{def}$, at which the defrost cycle should be initiated is during a period of peak energy demand and, if so,
   adjusting the time, $T_{def}$, at which a defrost cycle should be initiated.

7. The method for determining a defrost cycle for a refrigerator as in claim 6, wherein said adjusting step comprises delaying the time, $T_{def}$, at which the defrost cycle should be initiated.

8. The method for determining a defrost cycle for a refrigerator as in claim 6, wherein said adjusting step comprises advancing the time, $T_{def}$, at which the defrost cycle should be initiated.

9. The method for determining a defrost cycle for a refrigerator as in claim 1, wherein the defrost cycle is initiated at time $T_{def}$ and the method further comprises the steps of:
   ascertaining whether the power requirement for the evaporator fan is increasing and, if so, then
   predicting the time, $T_{def}$, at which a defrost cycle should be initiated for the refrigerator;
   determining whether the time, $T_{def}$, at which the defrost cycle should be initiated is during a period of peak energy demand and, if so,
   calculating the difference in the energy cost for initiating the defrost cycle during the period of peak energy demand versus during a period of non-peak energy demand; and
   using the results of said calculating step to determine whether the time, $T_{def}$, from said predicting step should be adjusted.

10. The method for determining a defrost cycle for a refrigerator as in claim 9, further comprising the step of delaying the time, $T_{def}$, at which the defrost cycle should be initiated.

11. The method for determining a defrost cycle for a refrigerator as in claim 9, further comprising the step of advancing the time, $T_{def}$, at which the defrost cycle should be initiated.

12. The method for determining a defrost cycle for a refrigerator as in claim 1, wherein said steps of monitoring and determining comprise:
   measuring the fan voltage supplied to the evaporator fan; and
   ascertaining whether the fan voltage has reached a predetermined voltage, $V_{def}$, and, if so, then
      detecting whether the fan speed has reached a certain minimum value and, if so, then
         initiating a defrost cycle for the refrigerator.

13. A refrigerator appliance, comprising:
   an evaporator;
   a fan for moving air over the evaporator for circulation within the refrigerator;
   at least one processing device configured to
      receive measurements of the power supplied to the fan; and
      determine whether the power requirement for the fan has reached a predetermined value and, if so,
         detect whether the fan speed has reached a certain minimum value and, if so, then
            initiate a defrost cycle for the refrigerator at time $T_{def}$.

14. The refrigerator appliance as in claim 13, wherein said processing device is further configured to
   ascertain whether the power requirement for the fan is increasing and, if so, then
   predict the time, $T_{def}$, at which a defrost cycle should be initiated for the refrigerator.

15. The refrigerator appliance as in claim 14, wherein if time $T_{def}$ would occur during a period of peak energy demand, said processing device is further configured to adjust the time, $T_{def}$, at which the defrost cycle should be initiated.

16. The refrigerator appliance as in claim 15, wherein said processing device is further configured to delay the time, $T_{def}$, at which the defrost cycle should be initiated.

17. The refrigerator appliance as in claim 15, wherein said processing device is further configured to advance the time, $T_{def}$, at which the defrost cycle should be initiated.

18. The refrigerator appliance as in claim 14, wherein if the time $T_{def}$ for initiating a defrost would occur during a period of peak energy demand, said processing device is further configured to
 calculate the difference in the energy cost for initiating the defrost cycle during the period of peak demand versus during a period a non-peak period of demand; and
 adjust the time, $T_{def}$, for initiating the defrost to a different time if such will lower the energy cost for operating the refrigerator.

19. The refrigerator appliance as in claim 18, wherein said refrigerator further comprises an input device whereby the per energy unit costs of electricity for operating the refrigerator may be provided to said processor.

* * * * *